United States Patent
Ramanna et al.

(10) Patent No.: US 11,374,518 B2
(45) Date of Patent: Jun. 28, 2022

(54) CONTROL UNIT AND METHOD TO DETECT STALL OR STEP-LOSS IN A STEPPER MOTOR

(71) Applicants: Robert Bosch GmbH, Stuttgart (DE); Robert Bosch Engineering and Business Solutions Private Limited, Karnataka (IN)

(72) Inventors: Shridhar Ramanna, Bangalore (IN); Thippeswamy Girijal Rahul, Bangalore (IN)

(73) Assignees: Robert Bosch GmbH, Stuttgart (DE); Robert Bosch Engineering and Business Solutions Private Limited, Bangalore (IN)

( * ) Notice: Subject to any disclaimer, the term of this patent is extended or adjusted under 35 U.S.C. 154(b) by 0 days.

(21) Appl. No.: 16/882,963

(22) Filed: May 26, 2020

(65) Prior Publication Data

US 2020/0382028 A1   Dec. 3, 2020

(30) Foreign Application Priority Data

May 22, 2019   (IN) ............................ 2019 4102 0276

(51) Int. Cl.
*H02P 8/38* (2006.01)
(52) U.S. Cl.
CPC ..................... *H02P 8/38* (2013.01)
(58) Field of Classification Search
CPC .............. G01R 31/34; H02P 8/38; H02P 7/06
See application file for complete search history.

(56) References Cited

U.S. PATENT DOCUMENTS

| | | | | |
|---|---|---|---|---|
| 5,079,653 A | * | 1/1992 | Gauthier | G11B 5/5547 360/78.13 |
| 6,262,554 B1 | * | 7/2001 | Kojima | G05B 19/39 318/445 |
| 8,023,216 B1 | * | 9/2011 | Cheung | G11B 5/59633 360/51 |
| 2006/0038517 A1 | * | 2/2006 | MacKay | H02P 8/34 318/685 |
| 2009/0153093 A1 | * | 6/2009 | Pinewski | H02P 8/36 318/696 |
| 2009/0160390 A1 | * | 6/2009 | Russ | H02P 8/36 318/696 |
| 2011/0181229 A1 | | 7/2011 | Galic et al. | |

* cited by examiner

*Primary Examiner* — Said Bouziane
(74) *Attorney, Agent, or Firm* — Maginot, Moore & Beck LLP

(57) ABSTRACT

A control unit is configured to determine a first parameter from a back EMF signal, and to determine at least one second parameter from the back EMF signal corresponding to the first parameter. The control unit verifies, based on the first parameter, at least one condition containing the at least one second parameter, and detects stall or step-loss in the stepper motor based on the verification. The control unit uses a pattern detection by identifying characteristic features of peaks of the back EMF signal, which are order, magnitude and polarity. These characteristic features are independent of RPM, backlash, load and do not require complex calculations and are very robust even at lower RPMs.

14 Claims, 4 Drawing Sheets

CONTROL UNIT AND METHOD TO DETECT STALL OR STEP-LOSS IN A STEPPER MOTOR

This application claims priority under 35 U.S.C. § 119 to patent application no. IN 2019 4102 0276, filed on May 29, 2019 in India, the disclosure of which is incorporated herein by reference in its entirety.

The present invention relates to a control unit and method to detect stall or step-loss while driving a stepper motor.

BACKGROUND

Sensor-less stall and step-loss detection in stepper based systems are demanded in various systems. In the system, motor operation is requested at lower Rotation Per Minute (RPM), with varying load and backlash, where the existing solutions are unable to detect stall or step-loss. The stall detection is required to achieve reference position, and no detection leads to excessive drive of actuator leading to reduced operational time or gradual damage to the drive. The stall detection is also used to detect damages, such as drive mechanics damage or even a motor damage, in a product which can occur in field. The existing solutions extract back Electro Motive Force (EMF) from a non-excited coil and use a threshold based comparison to detect stall or step-loss. The threshold is either dynamically derived based on RPM or statically fixed or calibrated for a given system.

The concept of stall detection is used in many systems. In most of the systems, the stepper motor is operated at a high RPM or operated in a system with lesser backlash or without any dynamic loading where stall detection is stable. The concept used in existing solution is by monitoring the back EMF. The stall is detected, when the back EMF drops below a given threshold or the back EMF goes near zero in case of a stall. With varying load and backlash in the drive at low RPMs (ideally chosen for need of torque or to avoid resonance), the stall detection tends to be not robust. In general there are several products in market which uses stepper motor. The stall detection is mainly used to detect damages in the mechanical drive or to achieve reference position and the step-loss detection is used for coarse correction.

A patent literature US20110181229 discloses an apparatus, system and method for stepper motor stall detection. An apparatus, system, and method are disclosed for stepper motor stall detection. A conversion module receives a back electromotive force ("EMF") waveform produced in a non-driven coil of the stepper motor by a magnetic field of a rotor of the stepper motor during a full step operation, and samples the waveform at intervals starting at a predetermined time for a predetermined period of time within the full step operation to yield a plurality of sampled data points. A rectification module rectifies the waveform about a predetermined quiescent level. A comparison module accumulates the rectified sampled data points into a statistically representative sampled value, compares the representative sampled value to a predetermined threshold level, and indicates a stall of the rotor if the representative sampled value is less than the predetermined threshold level.

SUMMARY

According to an exemplary embodiment of the disclosure, a control unit detects stall or step-loss in a stepper motor. The control unit is adapted to drive at least two field coils of the stepper motor, and to read a back Electro Motive Force (EMF) signal. The back EMF signal is measurable in a positive phase and a negative phase. The control unit is further adapted to determine a first parameter from the back EMF signal, determine at least one second parameter from the back EMF signal corresponding to the first parameter, verify, based on the first parameter, at least one condition containing the at least one second parameter, and detect stall or step-loss in the stepper motor based on the verification.

According to another exemplary embodiment of the disclosure, a method for detecting stall or step-loss in a stepper motor includes monitoring a back Electro Motive Force (EMF) signal from the stepper motor. The back EMF signal measurable in a positive phase and a negative phase. The method further includes determining, by a control unit, a first parameter of the back EMF signal; determining, by the control unit, at least one second parameter of the back EMF signal, corresponding to the first parameter; verifying by the control unit, based on the first parameter, at least one condition containing the at least one second parameter, and detecting, by the control unit, stall or step-loss in the stepper motor based on the verification.

BRIEF DESCRIPTION OF THE DRAWINGS

An embodiment of the disclosure is described with reference to the following accompanying drawings.

DETAILED DESCRIPTION

Figure 1:
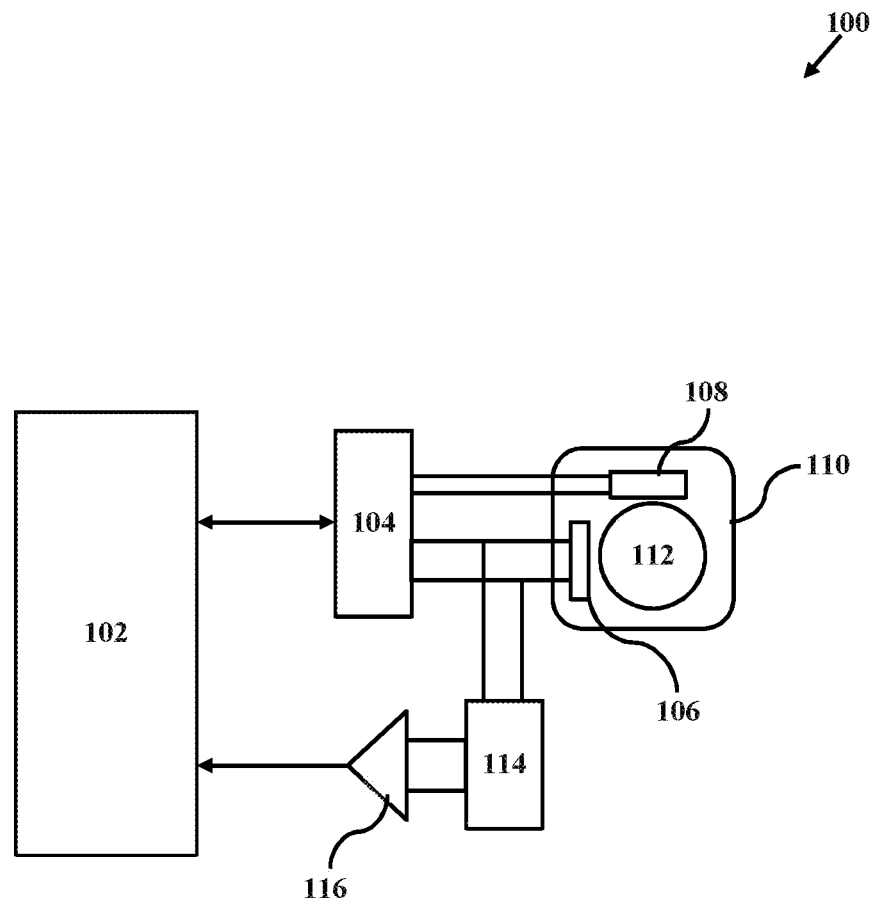
FIG. 1 illustrates a block diagram of a control unit for a stepper motor, according to an embodiment of the present invention.

FIG. 1 illustrates a block diagram of a control unit for a stepper motor, according to an embodiment of the present invention. A system 100 comprising the control unit 102 is provided to detect stall or step-loss in the stepper motor 110. The stall in the stepper motor may be due to the mechanical drive. The stepper motor 110 comprises a rotor 112, such as a magnet, and a stator, such as field coils or poles. The stepper motor 110 described is a two field coil, i.e. a first coil 106 and a second coil 108. The present invention is not limited to the two field coils based stepper motor 110, and instead applicable for the stepper motor 110 with multiple pole. The control unit 102 is adapted to drive at least two field coils (the first coil 106 and the second coil 108) of the stepper motor 110 through a driver circuit 104, and detect/read an electrical signal comprising back Electro Motive Force (EMF), shown in FIG. 2. The detection is performed through a detector circuit 114 and an amplifier 116. Any other detector circuit 114 is applicable to be used without departing from the scope of the present invention. The detector circuit 114 is shown connected across the first coil 106. The detector circuit 114 is connectable across the second coil 108 as well. Further, the detector circuit 114 is connectable across both the first coil 106 and the second coil 108. The detector circuit 114 extracts/reads back EMF signal of the stepper motor 110 with mid-level biasing.

The present invention is independent of the manner in which the back EMF signal is read or measured. The back EMF signal in the present invention is detected from a non-driven coil of the stepper motor 110, and the same is used throughout the disclosure. However, this is just an example and must not be understood in limiting manner. The control unit 102 is configured to detect the stall or step-loss for the back EMF signal detected/read by circuits or methods as known in the art.

Figure 2:
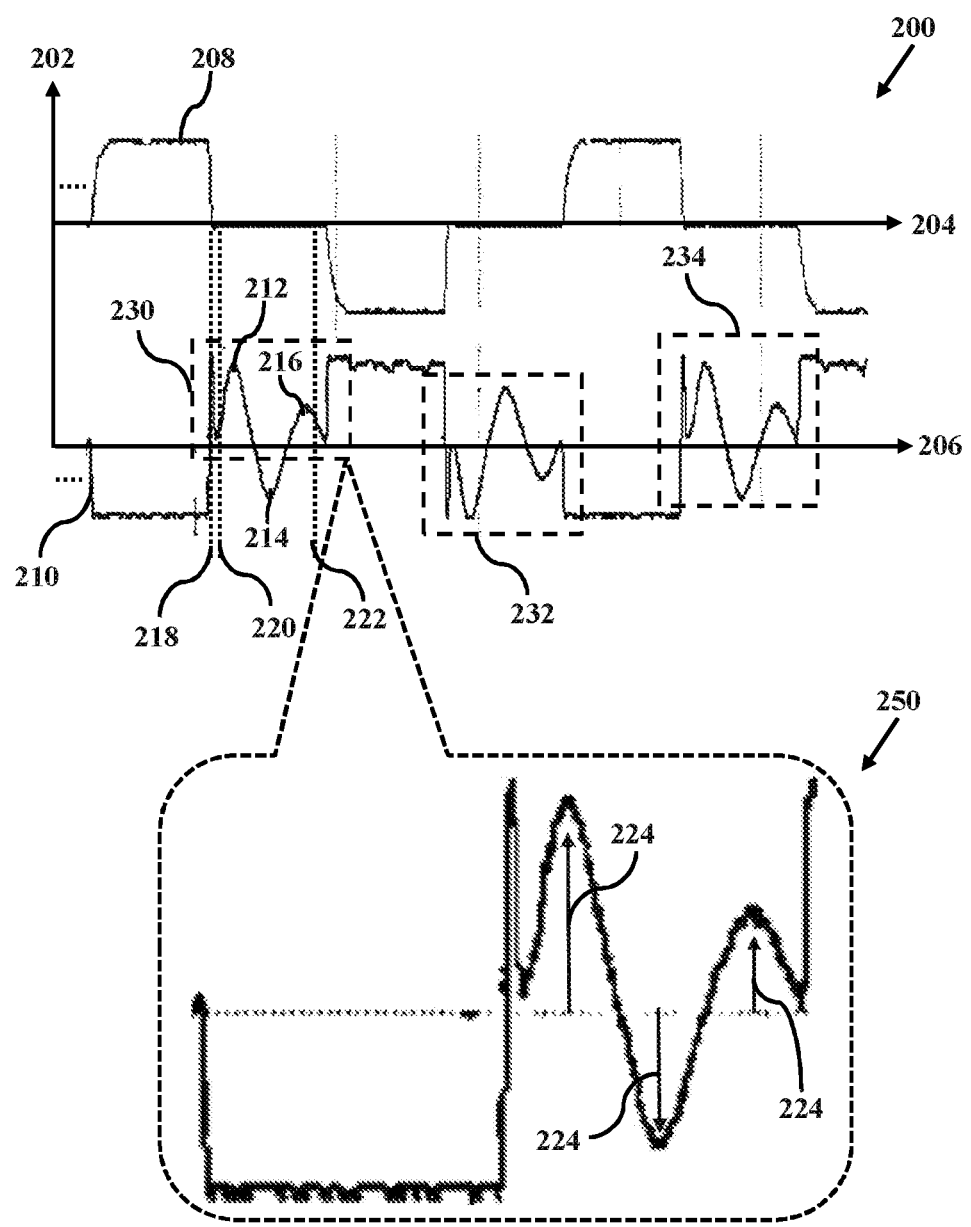
FIG. 2 illustrates a graph relating to the back EMF signal, according to an embodiment of the present invention.

FIG. 2 illustrates a graph relating to the back EMF signal, according to an embodiment of the present invention. The first graph 200 comprises a Y-axis 202 representing current in amperes shown as first waveform 208, and voltage in volts for a second waveform 210, i.e. the back EMF signal. The X-axis 204 for the first waveform 208 and the second waveform 210 is time in suitable units. Both the waveforms are shown after some time has elapsed, indicated by the dotted line in the beginning of each waveform. The back EMF signal is measurable in a positive phase and a negative phase. In continuation to FIG. 1, the control unit 102 is further adapted to determine a first parameter from the back EMF signal, determine at least one second parameter from the back EMF signal corresponding to the first parameter. The control unit 102 further verifies, based on the first parameter, at least one condition containing the at least one second parameter, and detect stall or step-loss in the stepper motor 110 based on the verification.

The first parameter determined by the control unit 102, is an order (n) of peaks in the back EMF signal. The order (n) corresponds to number of peaks in the back EMF signal. The at least one second parameter is selected from a group comprising a polarity ($P_n$) of each peak and an amplitude/magnitude ($M_n$) of each peak. The detector circuit 114 is used to extract/capture the order (n), the polarity ($P_n$) and magnitude ($M_n$) of the peak in the back EMF signal. During capturing, the back EMF signal induced in the first coil 106 is sampled at a high frequency such that the peaks are captured. The captured signal is then amplified to perform analysis to detect the stall or step-loss.

The first waveform 208 corresponds to actuation signal for the at least two coils. In case of two-pole stepper motor 110, a pulse in the first waveform 208 signifies actuation of the first coil 106, and an absence of the pulse signifies the first coil 106 is not driven. However, at the time when the first coil 106 is not driven, the second coil 108 may or may not be driven, but that is not shown in the FIG. 2 to avoid complexity. Further, the positive phase/cycle corresponds to the part of the waveform which is above X axis (204, 206), and the negative phase/cycle corresponds to the part of the waveform which is below the X-axis (204, 206). The back EMF signal shown in FIG. 2 comprises three peaks and without any stall or step-loss. In specific, a first instance 230 shows back EMF signal in the positive phase, a second instance 232 shows back EMF signal in the negative phase and a third instance 234 shows the back EMF signal in the positive phase and the like.

An enlarged portion 250 of the back EMF signal is illustrated. The enlarged portion 250 is shown to indicate the magnitude of the peaks. A first magnitude 224 of the first peak 212, a second magnitude 224 of the second peak 214 and a third magnitude 224 of the third peak 216 is illustrated. Still further, a time slot between a time $t_1$ 218 and time $t_2$ 220 is considered as a dead zone. To overcome wrong detection due to inductor discharge, the control unit 102 processes the back EMF signal after the dead zone/window/time is elapsed. Thus, the dead zone is discarded for detection of stall or step-loss in the back EMF signal. The time slot between time $t_2$ 220 and time $t3$ 222 is working zone, where the detection of the stall or steploss is performed by the control unit 102. Also, the peaks are considered only when the magnitude of the peak is above a threshold level, in both the positive phase and the negative phase.

Figure 3:
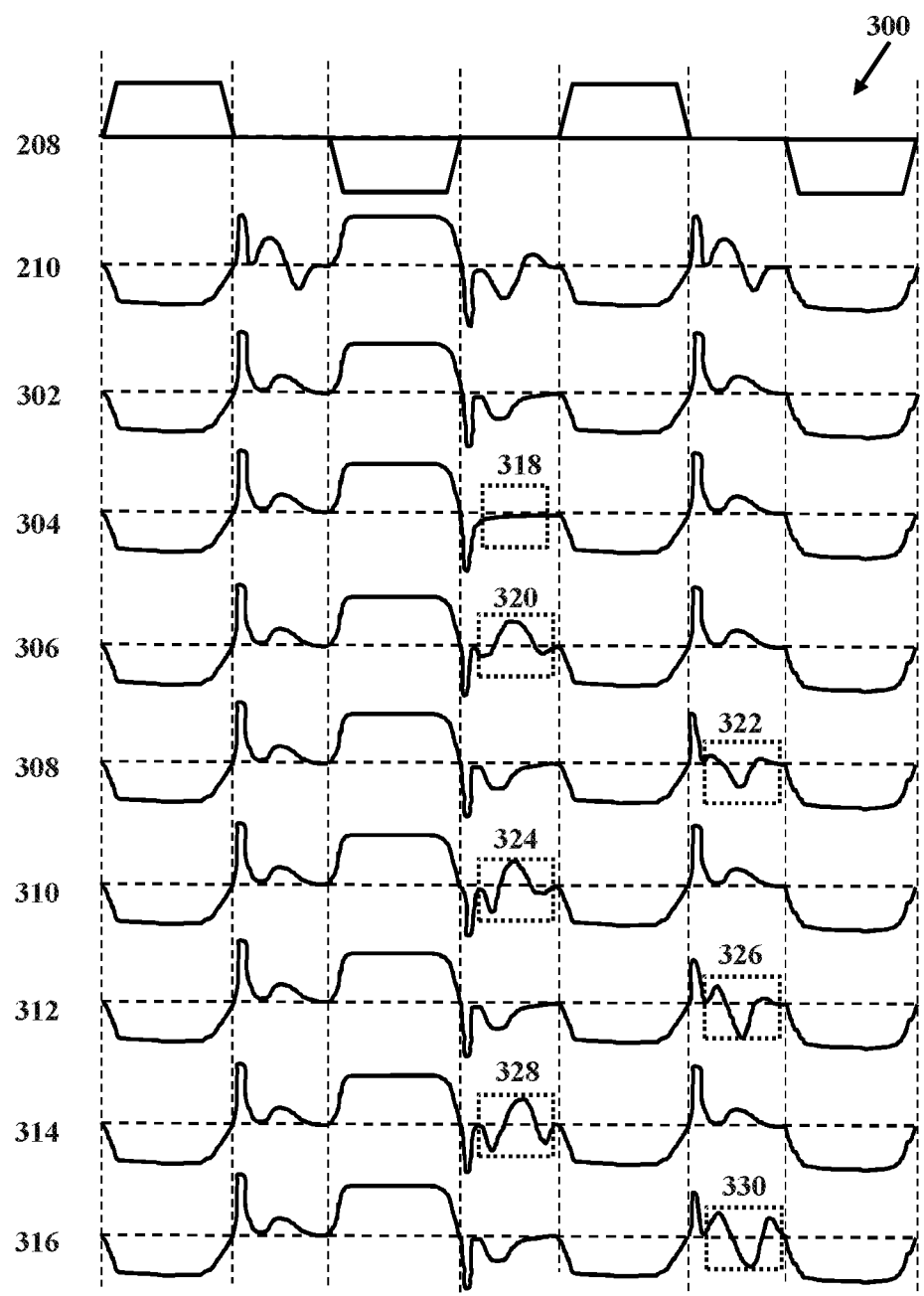
FIG. 3 illustrates multiple cases of detection of stall or step-loss, according to an embodiment of the present invention.

FIG. 3 illustrates multiple cases of detection of stall or step-loss, according to an embodiment of the present invention. The FIG. 3 illustrates a second graph 300 with multiple waveforms. It should be noted that, the graph is not to the scale and is an attempt to explain the present invention and therefore the same must not be understood in a limiting manner. The first waveform 208 represents current as shown in the FIG. 2. Similarly, the second waveform 210 represents back EMF signal in volts. Another example of the back EMF signal is shown by a third waveform 302, where there is only one peak, after the dead zone, whereas in the second waveform 210 there are two peaks one above and other below the axis. The second waveform 210 and the third waveform 302 are shown for enabling clear understanding, and there is no stall or step-loss in the same.

The control unit 102 detects the stall or step-loss in the stepper motor 110, when order is equal to zero, as illustrated in fourth waveform 304. If there are no peaks in the back EMF signal, then the control unit 102 detects this condition as stall or step-loss condition and records in a memory element. A first window (depicted in dotted boundary) 318 shows absence of the peak. This is applicable for a positive phase/cycle of the back EMF signal as well.

In accordance to an embodiment of the present invention, the control unit 102 is adapted to detect the stall or step-loss in the stepper motor 110 when order is equal to one. When the order (n) is equal to one, the at least one condition, to be verified by the control unit 102 comprises, the polarity of the first peak 212 is, any one from a group comprising, negative in the positive phase of the back EMF signal, and positive in the negative phase of the back EMF signal. A fifth waveform 306 represents the back EMF signal having only first peak 212, where the stall or steploss is detected in the negative phase. A second window 320 shows the stall or steploss in the fifth waveform 306. The peak inside the second window 320, which is above the axis (shown in dashed line) is considered as the first peak 212. Being above the axis, the polarity of the first peak 212 is positive. The two peaks below the axis are discarded due to being lower than a threshold limit. Since, the polarity of the first peak 212 is positive in the negative phase, the control unit 102 detects this as the stall or step-loss, and records/stores in the memory element. Similarly, a sixth waveform 308 represents stall or step-loss detection for a single peak but in the positive phase. A third window 322 shows the polarity of the first peak 212 being negative in the positive phase. The control unit 102 detects this condition as stall or step-loss and stores in the memory element.

In accordance to another embodiment of the present invention, the control unit 102 is adapted to detect the stall or step-loss when the order (n) is equal to two. When the order is two, the at least one condition to be verified by the control unit 102 comprises, the polarity of the first peak 212 and the second peak 214 are, any one selected from a list comprising negative and positive, respectively, in the positive phase of the back EMF signal; and positive and negative, respectively, in the negative phase of the back EMF signal. A waveform for this condition is not shown to avoid overcrowding of the FIG. 3.

In accordance to another embodiment of the present invention, the control unit 102 is adapted to detect the stall or step-loss when the order is equal to two and when one condition containing the magnitude of the peaks is fulfilled. The at least one condition to be verified by the control unit 102 comprises, a magnitude 224 of the first peak 212 is less than the magnitude 224 of the second peak 214. The magnitude of the peaks are considered with predetermined tolerances. A seventh waveform 310 represents the back EMF signal for the order equal to two. A fourth window 324 shows the presence of two peaks. The polarity of the first peak 212 is negative and that of the second peak 214 is positive. The condition on polarity shows no stall or step-loss. However, the magnitude 224 of the first peak 212 is less than the magnitude 224 of the second peak 214. This condition if matched is detected as stall or step-loss, and the control unit 102 stores this detection in the memory element. Thus, the condition containing the magnitudes is an alternative to the condition based on polarity. Further, the condition of magnitude is allowed to be verified before the condition on the polarity. Similarly, an eighth waveform 312 shows the stall or step-loss in the positive phase for the back EMF signal with two peaks. The polarity of the first peak 212 is positive and that of the second peak 214 is negative, thereby the stall or step-loss is not detected. However, the magnitude 224 of the first peak 212 is less than the magnitude 224 of the second peak 214. This condition is detected by the control unit 102 as the stall or step-loss, and consequently, the control unit 102 stores this data in the memory element.

In accordance to another embodiment of the present invention, the control unit 102 is adapted to detect the stall or step-loss when the order (n) is equal to three. When the order is three, the at least one condition to be verified by the control unit 102 comprises, the polarity of the first peak 212, the second peak 214 and the third peak 216 are, any one selected from a group comprising negative, positive and negative, respectively, in the positive phase of the back EMF signal; and positive, negative and positive, respectively, in the negative phase of the back EMF signal. Again, a waveform for this condition is not shown to avoid overcrowding of the FIG. 3. Before the at least one condition relating to the order three is checked, the control unit 102 checks the at least one condition applicable for order one and two for the one peak and two peaks available. If the at least one condition applicable for the order one and two matches, the control unit 102 detects a stall or step-loss condition, without even verifying the at least one condition applicable for the order three.

In accordance to another embodiment of the present invention, the control unit 102 is adapted to detect the stall or step-loss when the order is equal to three and when one condition containing the magnitude of the peaks if fulfilled. When the order (n) is equal to three, the at least one condition to be verified by the control unit 102 comprises, the magnitude 224 of the first peak 212 is less than the magnitude 224 of any one of the second peak 214 and the magnitude 224 of the third peak 216. To illustrate this condition, a ninth waveform 314 shows the back EMF signal with a fifth window 328. In the fifth window 328, three peaks are depicted. The polarity of the first peak 212 is negative, the second peak 214 is positive and the third peak 216 is negative, in the negative phase. This indicates no stall or step-loss condition. However, on comparing the magnitudes, the control unit 102 detects the magnitude 224 of the first peak 212 is lesser than the magnitude 224 of the second peak 214, but not less than the magnitude of the third peak 216. Thus, the control unit 102 detects this condition as stall or step-loss and stores in the memory element. Similarly, a tenth waveform 316 shows the stall or step-loss in the back EMF signal with three peaks for the positive phase. A sixth window 330 shows the polarity of the first peak 212 is positive, second peak 214 is negative and third peak 216 is positive, indicating no stall or step-loss. However, the magnitude 224 of the first peak 212 is less than the magnitude 224 of the second peak 214, but not less than the magnitude of the third peak 216, which is detected by the control unit 102 as stall or step-loss, and the same is recorded in the memory element.

In accordance to an embodiment of the present invention, once the order is greater than zero the control unit 102 is adapted to verify, the condition based on the polarity as a first step, followed by the condition based on the magnitude. Alternatively, the control unit 102 is also configurable to verify the condition based on the magnitude first, followed by the condition based on the polarity.

In accordance to another embodiment of the present invention, the control unit 102 extracts the back EMF signal from the at least two coils based on which coil is inactive or not driven. Example: In case of two coils based stepper motor 110, when the first coil 106 is active/driven, the second coil 108 is inactive, thus the control unit 102 captures the back EMF signal from the second coil 108. Next, when the second coil 108 is active, and the first coil 106 is inactive, the control unit 102 captures the back EMF signal from the first coil 106. Thus, the control unit 102 is provided with more data samples to detect the stall or step-loss in lesser time as compared to the case where only the first coil 106 is used to capture the back EMF signal. The control unit 102 processes the captured back EMF signal along with the verification of the at least one condition, before capturing the back EMF signal in the next phase.

In an embodiment, the stall or step-loss detection is incremented/decremented to a threshold number. Once the number of stall or steploss detection goes beyond the threshold number, then the stall or step-loss is confirmed. The threshold number is configurable as per the requirement. Once the stall or step-loss is detected, the control unit 102 triggers an alert to a user or operator of the same through at least one signal comprising but not limited to an audio, a display, a light, haptic means and the like.

Figure 4:
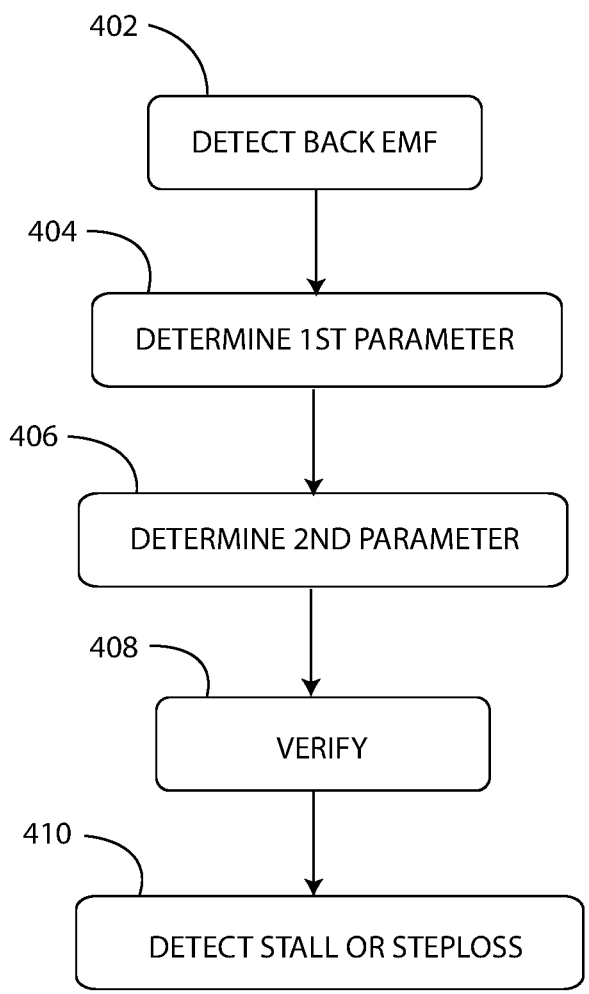
FIG. 4 illustrates a method for detecting stall or step-loss in the stepper motor, according to the present invention.

FIG. 4 illustrates a method for detecting stall or step-loss in the stepper motor, according to the present invention. The method comprising the steps of: a step 402 comprising monitoring back Electro Motive Force (EMF) signal from the stepper motor 110. The back EMF signal is detected or measured or extracted in a manner known in the art and is not limited to any specific method. The back EMF signal measurable in the positive phase and the negative phase. The method is characterized by a step 404 comprising, determining, by the control unit 102, the first parameter of the back EMF signal. A next step 406 comprises determining, by the control unit 102, at least one second parameter of the back EMF signal, corresponding to the first parameter. A step 408 comprises, verifying, based on the first parameter, at least one condition containing the at least one second parameter. A step 410 comprises detecting, by the control unit 102, stall or step-loss in the stepper motor 110 based on the verification.

The first parameter is order (n) of peaks in the back EMF signal. The at least one second parameter is selected from the group comprising the polarity ($P_n$) of each peak and the magnitude ($M_n$) of each peak.

The conditions to be verified subsequent to determining the order of the back EMF signal is same as explained and covered under the description of FIG. 3. The same description is not made here to avoid repetition. However, before start of actuation of the stepper motor 110, the current electrical phase is read from the driver circuit 104 to synchronize with the phase of the back EMF signal. The phase is used further to detect the polarity and magnitude as required.

The control unit 102 is also adapted to identify a stall condition and the steploss condition. In a case where a lead screw mechanism is operated by the stepper motor 110, the stall is identified if an end position of the lead screw is reached. If the peaks are observed before reaching the end position, then this condition is identified to be a step-loss. The method of identifying between the stall and the step-loss follows the corresponding steps as described for the control unit 102.

According to the present invention, the existing solution needs tuning and the threshold for the back EMF signal is directly proportional to the rotations per minute (RPM), but the present invention is independent of the RPM and does not require and tuning or simulation to establish the factors. One of the application area of the implementation of the present invention is but not limited to is a Semi-active Damping Control (SDC) systems for a vehicle, throttle control, instrument panel and in many linear positioning systems (e.g. Heads-up Display). The present invention uses a pattern detection by identifying the characteristic features of the peaks of the back EMF signal, which are order (n), magnitude and polarity. These characteristics features are independent of RPM, backlash, load and does not require any complex calculations and is very robust even at lower RPMs.

It should be understood that embodiments explained in the description above are only illustrative and do not limit the scope of this invention. Many such embodiments and other modifications and changes in the embodiment explained in the description are envisaged. The scope of the invention is only limited by the scope of the claims.

We claim:

1. A system, comprising:
   a driver circuit operably connected to a stepper motor and configured to drive at least two field coils of said stepper motor; and
   a detector circuit configured to read a back Electro Motive Force (EMF) signal of said stepper motor, said back EMF signal measurable in a positive phase and a negative phase; and
   a controller operably connected to said driver circuit and said detector circuit, said controller configured:
      to determine a first parameter from said back EMF signal,
      to determine at least one second parameter from said back EMF signal corresponding to said first parameter,
      to verify, based on said first parameter, at least one condition containing said at least one second parameter, and
      to detect stall or step-loss in said stepper motor based on said verification,
   wherein said first parameter is an order of peaks in said back EMF signal, and
   wherein said at least one second parameter is at least one of a polarity of each peak and a magnitude of each peak.

2. The system as claimed in claim 1, wherein when said order is equal to two, said at least one condition to be verified comprises, determining that said polarity of a first peak and a second peak are a) negative and positive, respectively, in a positive phase of said back EMF signal, or b) positive and negative, respectively, in a negative phase of said back EMF signal.

3. The system as claimed in claim 2, wherein when said order is equal to two, said at least one condition to be verified comprises, determining that a magnitude of said first peak is less than a magnitude of said second peak.

4. The system as claimed in claim 1, wherein when said order is equal to three, said at least one condition to be verified comprises, determining that said polarity of a first peak, a second peak and a third peak are a) negative, positive and negative, respectively, in a positive phase of said back EMF signal, or b) positive, negative and positive, respectively, in a negative phase of said back EMF signal.

5. The system as claimed in claim 4, wherein when said order is equal to three, at least one condition to be verified comprises, determining that a magnitude of said first peak is less than a magnitude of any one of said second peak and that of said third peak.

6. The system as claimed in claim 5, wherein before said at least one condition applicable for order is equal to three is verified, said controller is configured to verify at least one corresponding condition applicable for order equal to two.

7. A system, comprising:
   a driver circuit operably connected to a stepper motor and configured to drive at least two field coils of said stepper motor; and
   a detector circuit configured to read a back Electro Motive Force (EMF) signal, said back EMF signal measurable in a positive phase and a negative phase; and
   a controller operably connected to said driver circuit and said detector circuit, said controller configured:
      to determine a first parameter from said back EMF signal,
      to determine at least one second parameter from said back EMF signal corresponding to said first parameter,
      to verify, based on said first parameter, at least one condition containing said at least one second parameter, and
      to detect stall or step-loss in said stepper motor based on said verification,
   wherein said first parameter is an order of peaks in said back EMF signal,
   wherein said at least one second parameter is at least one of a polarity of each peak and a magnitude of each peak, and
   wherein when said order is equal to one, said at least one condition to be verified comprises, determining that said polarity of said peak is a) negative in a positive phase of said back EMF signal, or b) positive in a negative phase of said back EMF signal.

8. A method for detecting stall or step-loss in a stepper motor, comprising:
   detecting a back Electro Motive Force (EMF) signal from said stepper motor using a detector unit operably connected to said stepper motor, said back EMF signal measurable in a positive phase and a negative phase;
   determining, using a controller operably connected to said detector unit, a first parameter of said back EMF signal;
   determining, using said controller, at least one second parameter of said back EMF signal, corresponding to said first parameter;
   verifying using said controller, based on said first parameter, at least one condition containing said at least one second parameter; and
   detecting, using said controller, the stall or step-loss in said stepper motor based on said verification,
   wherein said first parameter is an order of peaks in said back EMF signal, and wherein said at least one second parameter is at least one of a polarity of each peak and a magnitude of each peak.

9. The method as claimed in claim 8, wherein when said order is equal to one, said at least one condition to be verified comprises, determining that said polarity of said peak is a) negative in a positive phase of said back EMF signal, or b) positive in a negative phase of said back EMF signal.

10. The controller as claimed in claim 8, wherein when said order is equal to two, said at least one condition to be verified comprises, determining that said polarity of a first peak and a second peak are a) negative and positive, respectively, in a positive phase of said back EMF signal, or b) positive and negative, respectively, in a negative phase of said back EMF signal.

11. The controller as claimed in claim 10, wherein when said order is equal to two, said at least one condition to be verified comprises, determining that a magnitude of said first peak is less than a magnitude of said second peak.

12. The controller as claimed in claim 8, wherein when said order is equal to three, said at least one condition to be verified comprises, determining that said polarity of a first peak, a second peak and a third peak are a) negative, positive and negative, respectively, in a positive phase of said back EMF signal, or b) positive, negative and positive, respectively, in a negative phase of said back EMF signal.

13. The controller as claimed in claim 12, wherein when said order is equal to three, at least one condition to be verified comprises, determining that a magnitude of said first peak is less than said magnitude of any one of said second peak and that of said third peak.

14. The controller as claimed in claim 13, wherein before said at least one condition applicable for order is equal to three is verified, said controller is configured to verify at least one corresponding condition applicable for order equal to two.

* * * * *